US011148564B1

(12) United States Patent
Lee et al.

(10) Patent No.: US 11,148,564 B1
(45) Date of Patent: Oct. 19, 2021

(54) SEAT FRAME FOR VEHICLE

(71) Applicants: HYUNDAI MOTOR COMPANY, Seoul (KR); KIA MOTORS CORPORATION, Seoul (KR)

(72) Inventors: Sang Heon Lee, Seoul (KR); Jin Ho Hwang, Cheonan-si (KR); Dong Eun Cha, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/036,637

(22) Filed: Sep. 29, 2020

(30) Foreign Application Priority Data

Jun. 9, 2020 (KR) .................. 10-2020-0069756

(51) Int. Cl.
| | |
|---|---|
| *B60N 2/16* | (2006.01) |
| *B60N 2/30* | (2006.01) |
| *B60N 2/12* | (2006.01) |
| *B60N 2/68* | (2006.01) |
| *B60N 2/02* | (2006.01) |
| *B60N 2/60* | (2006.01) |

(52) U.S. Cl.
CPC ............. *B60N 2/68* (2013.01); *B60N 2/0232* (2013.01); *B60N 2/12* (2013.01); *B60N 2/165* (2013.01); *B60N 2/60* (2013.01)

(58) Field of Classification Search
CPC ........ B60N 2/0232; B60N 2/12; B60N 2/165; B60N 2/60; B60N 2/68
See application file for complete search history.

(56) References Cited

U.S. PATENT DOCUMENTS

| | | | | |
|---|---|---|---|---|
| 6,065,798 | A * | 5/2000 | Sankrithi | ................ B60P 3/423 296/181.1 |
| 6,789,844 | B1 * | 9/2004 | Dennis | ................ B60N 2/4242 297/216.1 |
| 2003/0141731 | A1 | 7/2003 | Betts et al. | |

(Continued)

FOREIGN PATENT DOCUMENTS

| | | |
|---|---|---|
| CN | 201033610 Y | 3/2008 |
| KR | 20-1998-0044747 U | 9/1998 |

(Continued)

OTHER PUBLICATIONS

Korean Office Action dated Aug. 17, 2021, issued in corresponding Korean Patent Application No. 10-2020-0069756.

*Primary Examiner* — Shin H Kim (74) *Attorney, Agent, or Firm* — Morgan, Lewis & Bockius LLP (57) ABSTRACT

A seat frame of a vehicle including: a main frame, one end of which is connected to the vehicle to be movable forwards and rearwards and an opposite end of which is connected to a loop of the vehicle such that a height of the main frame is adjusted upwards and downwards; an auxiliary frame provided in an interior of the main frame and connected to the main frame to be rotatable with respect to the main frame by a predetermined angle so as to be unfolded and folded such that the auxiliary frame acts as a seat when being unfolded and acts as a partition that partitions an interior space of the vehicle when being folded; and a rail, in which the main frame is fitted and which acts as a path, along which the main frame moves to the front and rear sides of the vehicle.

14 Claims, 7 Drawing Sheets

(56) References Cited

U.S. PATENT DOCUMENTS

| | | | | |
|---|---|---|---|---|
| 2010/0320826 | A1* | 12/2010 | Wilson | B60N 2/68 |
| | | | | 297/452.18 |
| 2011/0108666 | A1* | 5/2011 | Pozzi | B64D 11/062 |
| | | | | 244/118.6 |
| 2011/0233339 | A1* | 9/2011 | Plant | B64D 11/0696 |
| | | | | 244/131 |
| 2013/0307310 | A1* | 11/2013 | Saada | B64D 11/0649 |
| | | | | 297/452.2 |
| 2014/0232153 | A1* | 8/2014 | Bell | B64D 11/0649 |
| | | | | 297/232 |
| 2019/0084453 | A1* | 3/2019 | Petit | B60N 2/0881 |
| 2021/0101506 | A1* | 4/2021 | Scott | B60P 7/0815 |
| 2021/0101508 | A1* | 4/2021 | Wang | B60N 2/68 |
| 2021/0170922 | A1* | 6/2021 | Aktas | B60N 2/3065 |

FOREIGN PATENT DOCUMENTS

| | | |
|---|---|---|
| KR | 20-2000-0003712 U | 2/2000 |
| KR | 10-2007-0064466 A | 6/2007 |

* cited by examiner

SEAT FRAME FOR VEHICLE

CROSS REFERENCE TO RELATED APPLICATION

The present application claims priority to Korean Patent Application No. 10-2020-0069756, filed on Jun. 9, 2020, the entire contents of which is incorporated herein for all purposes by this reference.

TECHNICAL FIELD

The present disclosure relates to a seat frame of a vehicle which may be installed in an interior space of the vehicle to be movable forwards and rearwards, and may be used as a seat when being unfolded and may be used as a partition that partitions a luggage space when being folded.

BACKGROUND

An interior space of a vehicle may be largely classified into a space, in which passengers ride, and a space for loading articles on the rear side of the vehicle. Seats may be provided in the passenger space, in which the passengers ride, such that the passengers may be seated, and the luggage space for loading the articles may be provided on the rear side of the vehicle such that the articles may be loaded in the luggage space.

Conventionally, in a car or a sport utility vehicle (SUV), a first row seat including a driver's seat and a passenger seat and a second row seat including passenger seats on the rear side of the first row seat are provided, and a luggage space is provided on the rear side of the second row seat. In a large-sized SUV vehicle or a van, a third row seat may be provided on the rear side of the second row seat to be folded or unfolded. The space of the third row seat may become a seat, on which passengers may be seated, if the third row seat is unfolded, and may become a luggage space, in which articles may be loaded, if the third row seat is folded.

The conventional vehicle has a limit in expanding or contracting the luggage space or moving the location of the seats. Even when neither the second row seat nor the third row seat is used, there may be limitations in loading articles because the expansion of the luggage space is extremely limited. Further, even when the luggage space is not used, there is a limitation in expanding the space for the second row seat or the third row seat. Further, in order to partition the passenger space and the luggage space, it is necessary to install a separate partition.

Due to the limitations, the interior space of the vehicle cannot be efficiently utilized.

SUMMARY

The present disclosure has been made in an effort to solve the above-mentioned problems, and provides a seat frame of a vehicle which is connected to be movable in an interior space of the vehicle such that the location thereof may be changed, and which may be freely unfolded or folded to be used as a seat or a partition that partitions the interior space.

In accordance with an aspect of the present disclosure, a seat frame of a vehicle includes: a main frame, one end of which is connected to the vehicle to be movable forwards and rearwards and an opposite end of which is connected to a loop of the vehicle such that a height of the main frame is adjusted upwards and downwards; an auxiliary frame provided in an interior of the main frame and connected to the main frame to be rotatable with respect to the main frame so as to be unfolded and folded; and a rail, in which the main frame is fitted, providing a path, along which the main frame is configured to move in the vehicle in a direction from a front side of the vehicle to a rear side of the vehicle or in a direction from the rear side of the vehicle to the front side of the vehicle.

A lower end of the main frame may be connected to a floor of the vehicle to be movable, and an upper end of the main frame may be connected to the loop of the vehicle such that the height of the main frame is adjusted according to a height from the floor to the loop, and the rail is provided on the floor of the vehicle.

A rack gear may be disposed on an inner surface of the rail, a pinion gear may be disposed in the main frame fitted in the rail, and a location of the main frame may be moved by an engagement relationship of the rack gar and the pinion gear.

A driving device that drives the pinion gear may be provided in the main frame such that the main frame moves along the rail as the driving device rotates.

The auxiliary frame may include a seatback frame and a seat cushion frame, the seatback frame is connected to the main frame side by side, and the seat cushion frame may be connected to the seatback frame to be rotatable with respect to the seatback frame to be unfolded and folded.

A headrest frame connected to the seatback frame to be movable upwards and downwards may be provided at an upper portion of the seatback frame.

The seat cushion frame may be located on a rear side of the seatback frame to be preserved in a linear form when being folded, and to have a curved shape when being unfolded.

A motor may be provided on an inner surface of the seatback frame, a protrusion is embedded in the motor, and the protrusion may be extracted toward the seatback frame when the seatback frame is unfolded such that a shape of the seatback frame is adjusted.

The main frame may include a rigid material, and the auxiliary frame may include a flexible material which is more flexible than the rigid material.

An outer covering may be mounted on the auxiliary frame, a winding reel, on which the outer covering is wound, may be provided at a lower end of the auxiliary frame, and the outer covering may be extracted from or inserted into the winding reel as the auxiliary frame is unfolded or folded, and the outer covering may include a mesh material.

The main frame may be provided with a stopper that is provided at a connection point with the auxiliary frame and fixes the auxiliary frame while the auxiliary frame is unfolded.

The auxiliary frame may be configured to be rotatable with respect to the main frame by a predetermined angle so as to be unfolded and folded.

The auxiliary frame may be configured to be unfolded such that the auxiliary frame acts as a seat, and the auxiliary frame may be configured to be folded such that the auxiliary frame acts as a partition that partitions an interior space of the vehicle.

In the seat frame according to the present disclosure, because the main frame is connected to the floor of the vehicle and the loop to be movable and the height of the main frame may vary according to the height of the loop, the passenger space or the luggage space may be expanded or contracted according to the necessity of the user such that the space may be efficiently utilized.

Further, because the auxiliary frame may be unfolded or folded to be used as a seat or a partition, it may be used as a seat or a partition according to occasions.

Further, because the auxiliary frame includes a seatback frame, a seat cushion frame, and a headrest frame, it has a shape and a structure, by which a passenger may feel comfortable and a stable feeling can be provided.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

Hereinafter, a preferred embodiment of the present disclosure will be described in detail with reference to the accompanying drawings. Similar reference numerals presented in the drawings designate similar elements.

The present disclosure relates to a seat frame connected to be movable along a floor F of a vehicle, and is a disclosure in which a main frame 100 is connected to be movable, and an auxiliary frame 200 acts as a seat (S) if being unfolded and acts as a partition if being folded to freely utilize an interior space of the vehicle. In particular, in the case of seats of three rows, a space can be efficiently utilized while a seat frame is utilized as a seat (S) if necessary while partitioning the space into a luggage space and an interior space.

Figure 1:
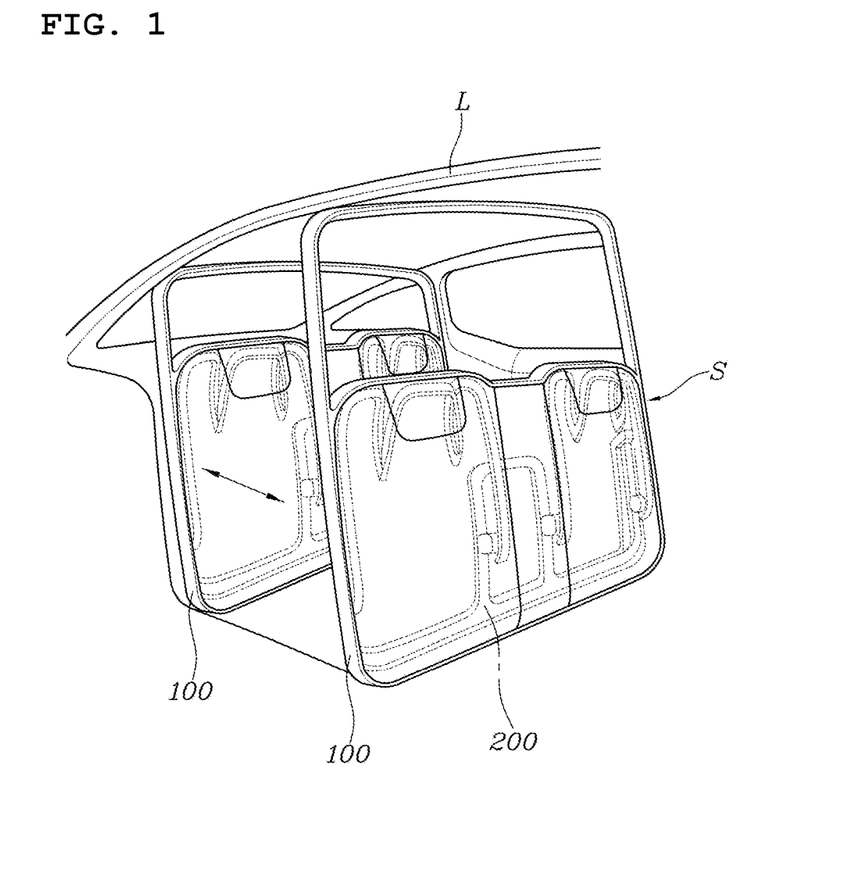
FIG. 1 is a perspective view of a seat frame of a vehicle according to an embodiment of the present disclosure.

FIG. 1 is a perspective view of a seat frame of a vehicle according to an embodiment of the present disclosure. Referring to FIG. 1, a seat frame of a vehicle according to an embodiment of the present disclosure may include a main frame 100, an auxiliary frame 200, and a rail 300.

The main frame 100 may have a ring shape. A lower end of the main frame 100 may be connected to a floor F of the vehicle, and an upper end of the main frame 100 may be connected to a loop L of the vehicle.

Figure 2:
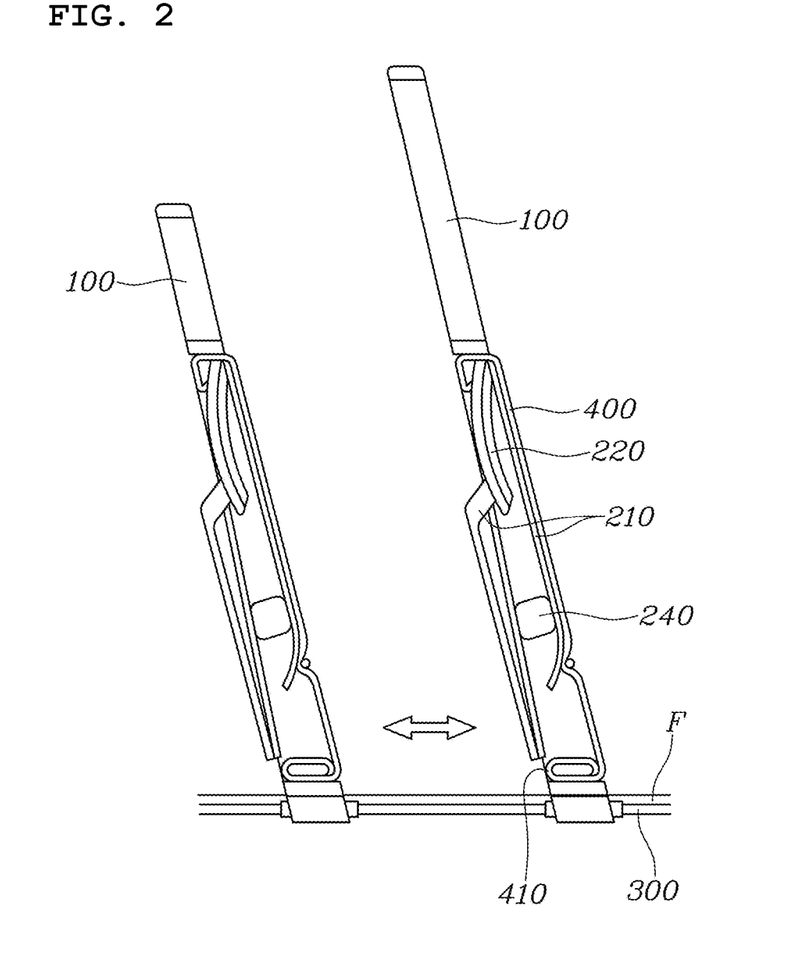
FIGS. 2 and 3 are views illustrating an appearance in which the seat frame of the vehicle is moved according to the embodiment of the present disclosure.

The lower end of the main frame 100 may be connected to the floor F to be movable. The rail 300 may be provided on the floor F, and the lower end of the main frame 100 is fitted in and connected to the rail 300 so as to be movable forwards and rearwards along the rail 300. As the main frame 100 is moved forwards and rearwards in an interior space of the vehicle along the rail 300, the location of a seat or the location of a partition may be adjusted. The rail 300 is illustrated in FIG. 2.

The upper end of the main frame 100 may be connected to the loop L to be movable along the loop L. Because the upper end of the main frame 100 is connected to the loop L, the height of the main frame 100 may be adjusted along the height of the loop L. Because the loop L of the vehicle has a shape in which the center of the vehicle body is highest and the height of the vehicle body decreases forwards and rearwards, the height of the loop L should vary according to a point at which the main frame 100 is located in the interior of the vehicle.

Accordingly, the main frame 100 may be configured such that the upward/downward height of the main frame 100 is adjusted according to the height from the floor F to the loop L. As illustrated in FIG. 1, the height of the main frame 100 may be configured to vary according to the movement thereof. For adjustment of the height of the main frame 100, the side surface of the main frame 100 may have a multi-stepped structure.

The auxiliary frame 200 may be provided in the interior of the main frame 100. The auxiliary frame 200 may be connected to the main frame 100 to be rotatable by a predetermined angle with respect to the main frame 100 so as to be unfolded or folded. If being unfolded, the auxiliary frame 200 acts as a seat while defining about 90 degrees with the main frame 100, and if being folded, it is disposed side by side with the main frame 100 to act as a partition that partitions the interior space of the vehicle body.

The interior space of the vehicle may be partitioned into a luggage space, in which luggage is loaded, and a passenger space, in which a passenger who rides. Because the auxiliary frame 200 acts as a partition that may partition the interior space of the vehicle if being folded, the luggage space and the passenger space may be differentiated by changing the location of the auxiliary frame 200 to partition the interior space of the vehicle. Accordingly, the interior space of the vehicle can be freely partitioned to be utilized.

In a situation in which a seat is necessary in the interior space of the vehicle, the auxiliary frame 200 may be utilized as a seat by locating the main frame 100 at an appropriate location and unfolding the auxiliary frame 200. Further, when the passenger space and the luggage space should be differentiated for loading luggage, the luggage space may be formed by folding the auxiliary frame 200 and moving the main frame 100. In this way, the limited interior space of the vehicle can be efficiently utilized.

Figure 3:
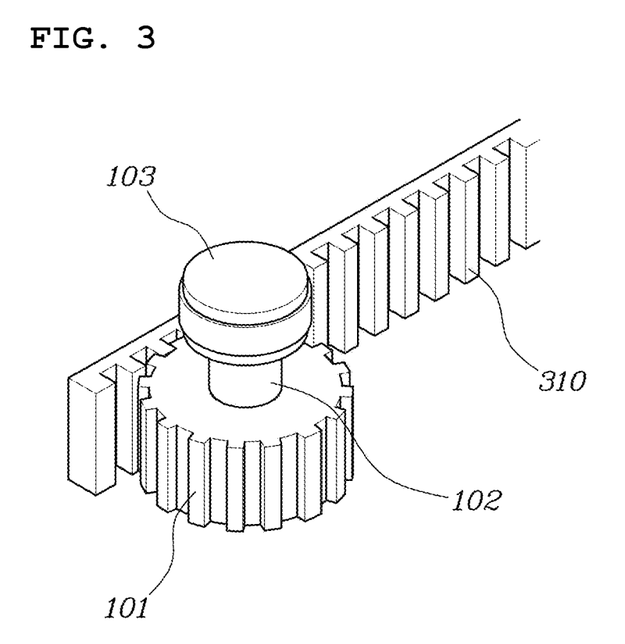

FIGS. 2 and 3 are views illustrating an appearance in which the seat frame of the vehicle is moved according to the embodiment of the present disclosure.

Referring to FIGS. 2 and 3, the rail 300 may be a path, along which the main frame 100 is moved forwards and rearwards in the interior space of the vehicle. The rail 300 may be provided on the floor F of the vehicle, and a lower end of the main frame 100 may be fitted in the rail 300.

Referring to FIG. 3, a rack gear 310 may be formed on an inner surface of the rail 300, and a pinion gear 101 may be formed on an outer surface of the main frame 100 fitted in the rail 300. When the main frame 100 is to be moved, the pinion gear 101 may be moved along the rack gear 310. That is, the location of the main frame 100 is moved through an engagement relationship of gears. Further, the main frame 100 may be simply slid on the rail 300, and in this case, a magnetic module may be provided to fix the location of the main frame 100.

Further, the main frame 100 may be provided with a driving device 103 that drives the pinion gear 101. The driving device 103 may be connected to the pinion gear 101 by a shaft 102, and may drive the pinion gear 101 such that the pinion gear 101 is moved along the rack gear 310 as the pinion gear 101 is rotated. A direction, in which the main frame 100 is moved, may be controlled by adjusting the rotational direction of the driving device 103. The location of the main frame 100 may be adjusted by operating the driving device 103.

Figure 4:
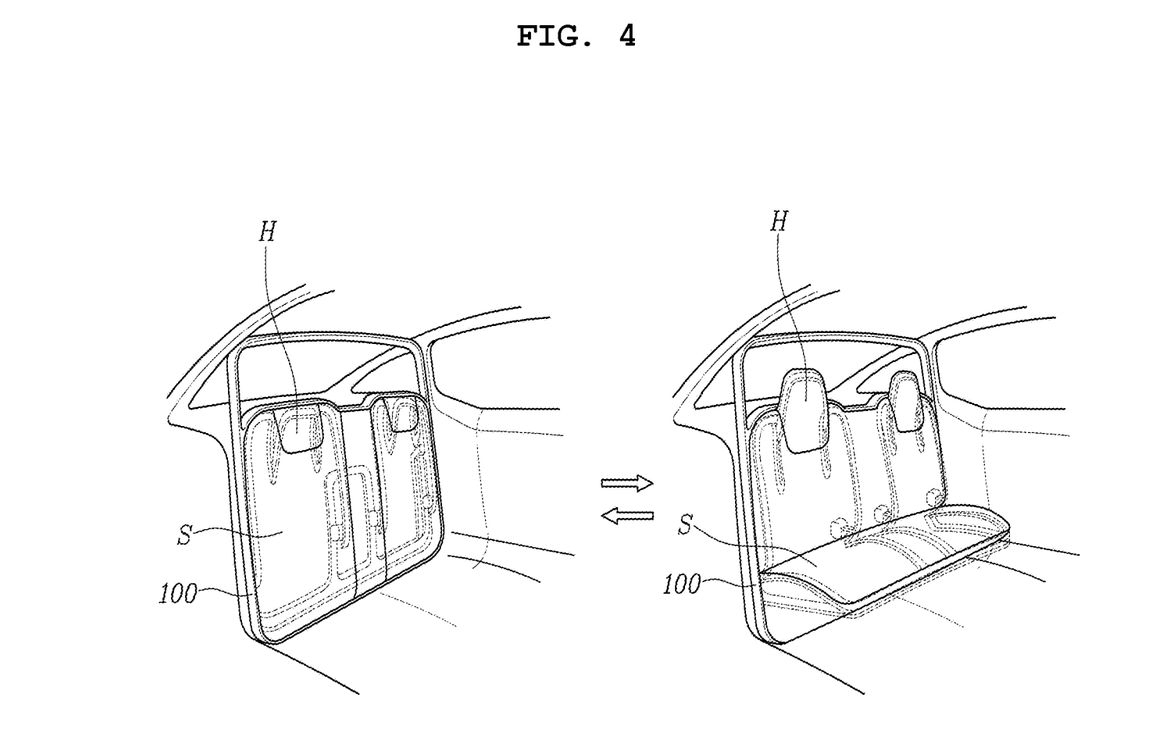
FIGS. 4 and 5 are views illustrating an appearance in which the seat frame of the vehicle is unfolded or folded according to the embodiment of the present disclosure.
Figure 5:
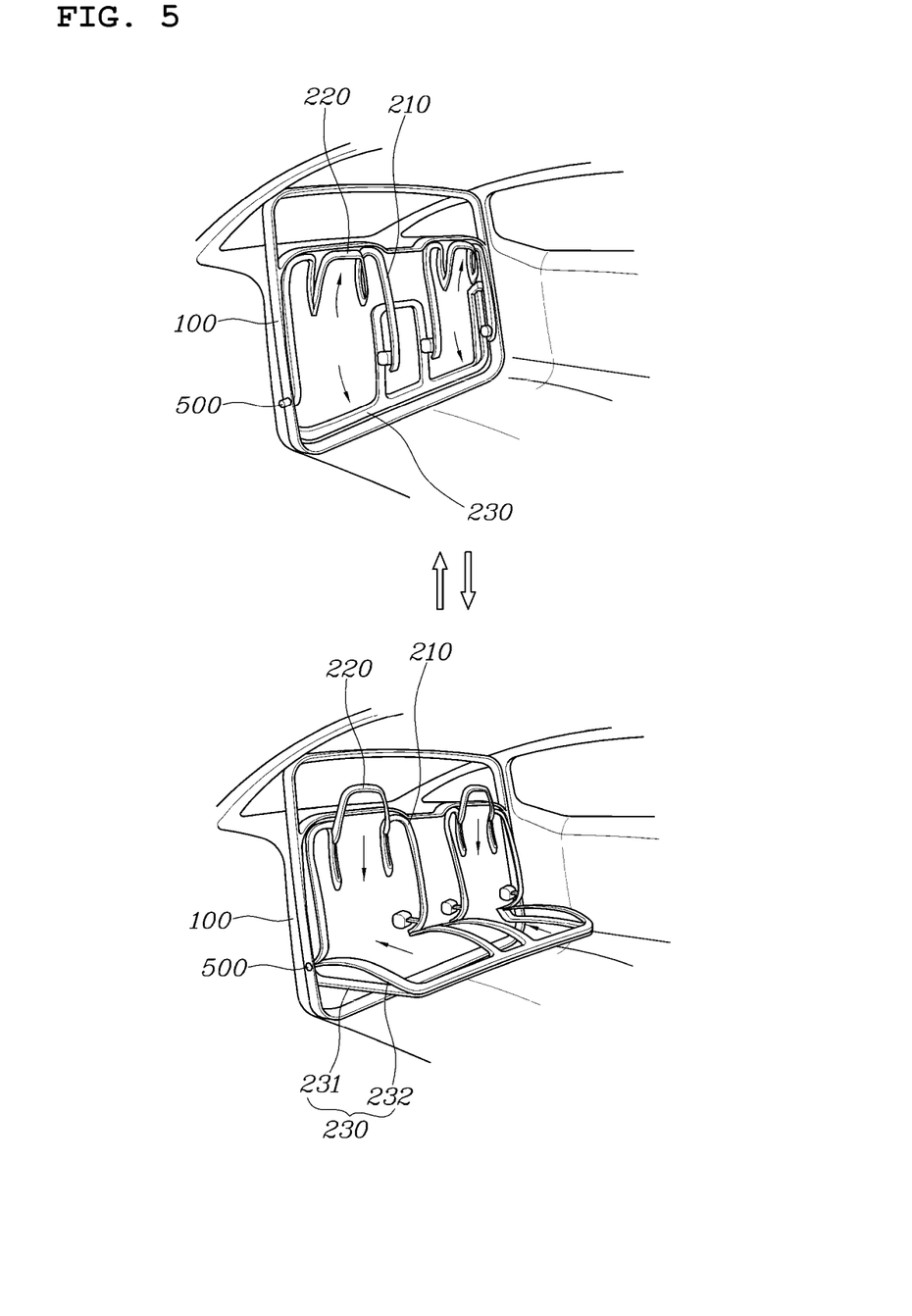

FIGS. 4 and 5 are views illustrating an appearance in which the seat frame of the vehicle is unfolded or folded according to the embodiment of the present disclosure. FIG. 4 is a view illustrating only the main frame 100 and the auxiliary frame 200 in FIG. 3.

Referring to FIGS. 4 and 5, the auxiliary frame 200 of the seat frame of a vehicle according to an embodiment of the present disclosure may include a seatback frame 210 and a seat cushion frame 230. The seatback frame 210 may be connected to the main frame 100 side by side to support, for example, a passenger when the passenger is seated. The seat cushion frame 230 may be connected to the seatback frame 210 to be rotatable such that the seat cushion frame 230 may be unfolded and folded. As illustrated in FIGS. 4 and 5, the seat cushion frame 230 may be rotated while being moved to the lower side of the seatback frame 210 to be disposed to face the front side, and thus a seat may be formed.

Further, a headrest frame 220 connected to the seatback frame 210 to be movable forwards and downwards may be provided at an upper portion of the seatback frame 210. The headrest H corresponds to a portion, at which the head of a passenger is laid, when the passenger is seated. The headrest frame 220 may be inserted through an upper portion of the seatback frame 210 when not being used, and may be lifted upwards to be extracted to the upper side of the seatback frame 210 when being used. As the headrest frame 220 may be inserted and extracted, a space can be prevented from being unnecessarily occupied by the headrest frame 220 and the space can be efficiently used.

The main frame 100 may be connected to the frame of the vehicle and may be formed of a rigid material such as a metal to firmly support the auxiliary frame 200. Because the auxiliary frame 200 contacts the body of a passenger, it may be formed of a flexible material which is more flexible than the rigid material.

The seat cushion frame 230 may be inserted into the rear side of the seatback frame 210 to be preserved in the folded state, and may maintain a linear shape by the seatback frame 210 in the preserved state and may have a curved shape such that the passenger may be seated while being unfolded. The auxiliary frame 200 may be formed of a flexible material such that the shape of the seat cushion frame 230 may be deformed according to a use state thereof. Accordingly, when the auxiliary frame 200 is used as a partition, the seat cushion frame 230 may be preserved in a linear form to secure a luggage space, and when the auxiliary frame 200 is used as a seat, the seat cushion frame 230 may have a curved shape such that a passenger feel comfortable when the passenger is seated.

Further, the seat cushion frame 230 may include a first seat cushion frame 231 that supports the lower body of the seated passenger, and a second seat cushion frame 232, on which an arm may be held. The second seat cushion frame 232 may be provided at the height of an arm of the passenger, and the center of the second seat cushion frame 232 may have a shape that is curved upwards such that the arm of the passenger may be held.

Referring to FIG. 5, the main frame 100 may be provided with a stopper 500 that fixes the auxiliary frame 200. The stopper 500 may be inserted into the auxiliary frame 200 at a point at which the auxiliary frame 200 is connected to the main frame 100. If the stopper 500 is inserted into the auxiliary frame 200 in a state in which the auxiliary frame 200 is rotated to be unfolded, the auxiliary frame 200 may be fixed so as to be prevented from being reversely rotated. Accordingly, when a passenger rides, the seat may be stably fixed by inserting the stopper 500 into the auxiliary frame 200.

Figure 6:
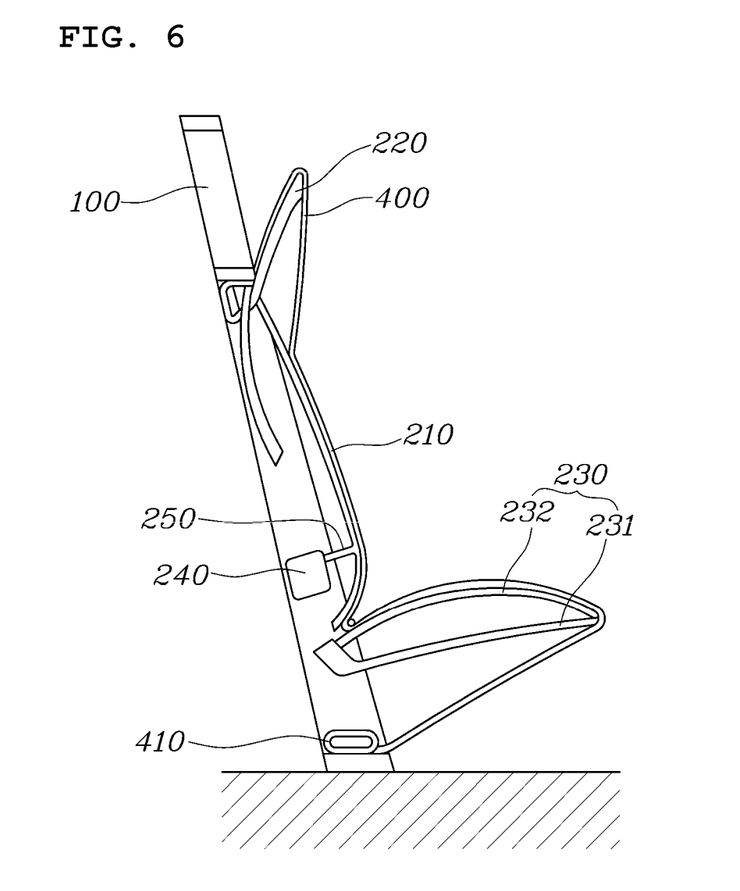
FIG. 6 is a cross-sectional view of the seat frame of a vehicle according to the embodiment of the present disclosure.

FIG. 6 is a cross-sectional view of the seat frame of a vehicle according to the embodiment of the present disclosure. FIG. 5 illustrates a state in which the auxiliary frame 200 is unfolded.

Referring to FIG. 6, a motor 240 may be provided on an inner surface of the seatback frame 210. Since the passenger lays his or her back on the seatback frame 210, the passenger may feel comfortable when the seatback frame 210 has a shape that is similar to the shape of the back. A protrusion 250 that protrudes toward the seatback frame 210 is embedded in the motor 240, and the protrusion 250 may be extracted if the motor 240 is driven. The protrusion 250 may push the seatback frame 210 outwards to deform the shape of the seatback frame 210 curvedly.

The motor 240 may be configured to be driven by the movement of the seat cushion frame 230. If the seat cushion frame 230 is rotated, the shape of the seatback frame 210 may become a shape that is comfortable when the passenger is seated as the protrusion 250 is extracted from the motor 240 such that the shape of the seatback frame 210 is curved.

Figure 7:
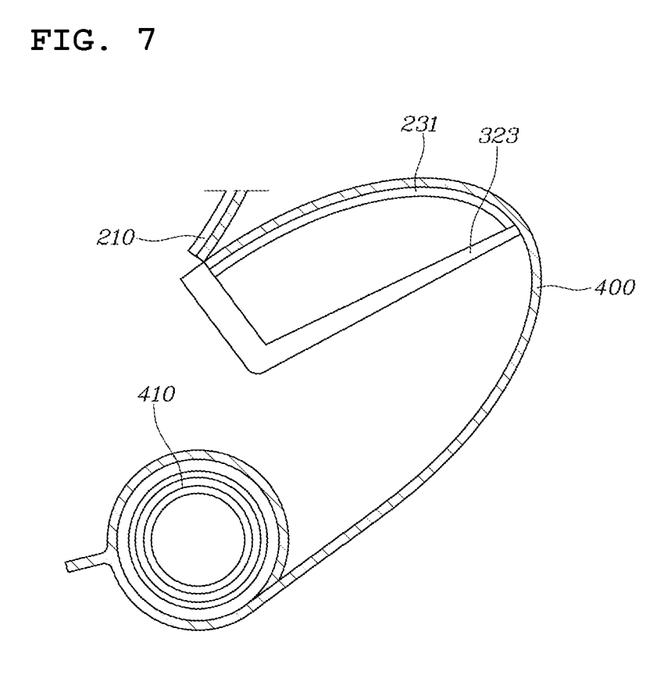
FIG. 7 is a cross-sectional view of a mesh seat and a winding reel of the seat frame of the vehicle according to the embodiment of the present disclosure.

FIG. 7 is a cross-sectional view of a mesh seat and a winding reel 410 of the seat frame of the vehicle according to the embodiment of the present disclosure.

Referring to FIG. 7, an outer covering 400 may be mounted on the auxiliary frame 200. The outer covering 400 may be formed of a mesh material that shows an excellent ventilation efficiency and an excellent drying efficiency. A winding reel 410, on which the outer covering 400 is wound, may be provided at a lower end of the auxiliary frame 200.

The outer covering 400 may be wound on the winding reel 410 to be preserved, and may be extracted from or inserted into the winding reel 410 by a necessary degree according to the folded or unfolded state of the auxiliary frame 200. If the auxiliary frame 200 is folded and then is unfolded, the outer covering 400 is extracted from the winding reel 410 along the auxiliary frame 200 to cover the entire auxiliary frame 200.

As described above, the seat frame of a vehicle according to the present disclosure may be installed in the interior space of the vehicle to be movable, and can utilize the space because the space may be expanded and contracted to the passenger space or the luggage space. When several passengers ride, the main frame 100 may be moved to the rear side of the vehicle to secure a wide passenger space. Further, when a large number of articles are loaded, the main frame 100 may be moved to the front side of the vehicle to secure a wide luggage space.

In particular, the auxiliary frame 200 may be connected to the main frame 100 to be rotatable so as to be folded or unfolded, and thus can be used as a seat or a partition, and accordingly, it is not necessary to provide a seat and a partition separately.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A seat frame of a vehicle, comprising:
 a main frame, one end of which is connected to the vehicle to be movable forwards and rearwards and an opposite end of which is connected to a loop of the vehicle such that a height of the main frame is adjusted upwards and downwards;
 an auxiliary frame provided in an interior of the main frame and connected to the main frame to be rotatable with respect to the main frame so as to be unfolded and folded; and
 a rail, in which the main frame is fitted, proving a path, along which the main frame is configured to move in the vehicle in a direction from a front side of the vehicle to a rear side of the vehicle or in a direction from the rear side of the vehicle to the front side of the vehicle.

2. The seat frame of claim 1, wherein a lower end of the main frame is connected to a floor of the vehicle to be movable, and an upper end of the main frame is connected to the loop of the vehicle such that the height of the main frame is adjusted according to a height from the floor to the loop, and the rail is provided on the floor of the vehicle.

3. The seat frame of claim 1, further comprising a rack gear disposed on an inner surface of the rail, and a pinion gear disposed in the main frame fitted in the rail, and wherein a location of the main frame is moved by an engagement relationship of the rack gar and the pinion gear.

4. The seat frame of claim 3, further comprising a driving device that drives the pinion gear is provided in the main frame such that the main frame moves along the rail as the driving device rotates.

5. The seat frame of claim 1, wherein the auxiliary frame comprises a seatback frame and a seat cushion frame, the seatback frame is connected to the main frame side by side, and the seat cushion frame is connected to the seatback frame to be rotatable with respect to the seatback frame to be unfolded and folded.

6. The seat frame of claim 5, wherein a headrest frame connected to the seatback frame to be movable upwards and downwards is provided at an upper portion of the seatback frame.

7. The seat frame of claim 5, wherein the seat cushion frame is located on a rear side of the seatback frame to be preserved in a linear form when being folded, and to have a curved shape when being unfolded.

8. The seat frame of claim 5, further comprising a motor provided on an inner surface of the seatback frame, a protrusion embedded in the motor,
 wherein the protrusion is extracted toward the seatback frame when the seatback frame is unfolded such that a shape of the seatback frame is adjusted.

9. The seat frame of claim 1, wherein the main frame includes a rigid material, and the auxiliary frame includes a flexible material which is more flexible than the rigid material.

10. The seat frame of claim 1, further comprising an outer covering mounted on the auxiliary frame, and a winding reel, on which the outer covering is wound, provided at a lower end of the auxiliary frame,
 wherein the outer covering is extracted from or inserted into the winding reel as the auxiliary frame is unfolded or folded.

11. The seat frame of claim 10, wherein the outer covering includes a mesh material.

12. The seat frame of claim 1, wherein the main frame is provided with a stopper that is provided at a connection point with the auxiliary frame and fixes the auxiliary frame while the auxiliary frame is unfolded.

13. The seat frame of claim 1, wherein the auxiliary frame is configured to be rotatable with respect to the main frame by a predetermined angle so as to be unfolded and folded.

14. The seat frame of claim 1, wherein the auxiliary frame is configured to be unfolded such that the auxiliary frame acts as a seat, and
 the auxiliary frame is configured to be folded such that the auxiliary frame acts as a partition that partitions an interior space of the vehicle.

\* \* \* \* \*